(12) United States Patent
Emerson et al.

(10) Patent No.: US 7,966,402 B2
(45) Date of Patent: Jun. 21, 2011

(54) SWITCH TO SELECTIVELY COUPLE ANY OF A PLURALITY OF VIDEO MODULES TO ANY OF A PLURALITY OF BLADES

(75) Inventors: Theodore F. Emerson, Tomball, TX (US); Rene Gaudet, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 11/168,129

(22) Filed: Jun. 28, 2005

(65) Prior Publication Data

US 2006/0294254 A1  Dec. 28, 2006

(51) Int. Cl.
*G06F 15/173* (2006.01)
*G06F 13/12* (2006.01)
*G06G 13/38* (2006.01)

(52) U.S. Cl. .......................................... 709/226; 710/73

(58) Field of Classification Search .................. 709/243, 709/203, 217, 226, 224; 710/73
See application file for complete search history.

(56) References Cited

U.S. PATENT DOCUMENTS

| | | | |
|---|---|---|---|
| 6,263,387 B1 * | 7/2001 | Chrabaszcz | 710/302 |
| 6,266,731 B1 | 7/2001 | Riley et al. | |
| 6,557,068 B2 | 4/2003 | Riley et al. | |
| 6,895,480 B2 * | 5/2005 | Heil | 711/153 |
| 6,915,362 B2 * | 7/2005 | Ramsey et al. | 710/62 |
| 7,080,181 B2 * | 7/2006 | Wolford | 710/302 |
| 7,519,749 B1 * | 4/2009 | Sivertsen | 710/73 |
| 2003/0065864 A1 * | 4/2003 | Hollinger | 710/305 |
| 2003/0131127 A1 * | 7/2003 | King et al. | 709/238 |
| 2004/0003162 A1 | 1/2004 | Chan et al. | |
| 2004/0024944 A1 | 2/2004 | Riley | |
| 2004/0199699 A1 | 10/2004 | Bobbitt et al. | |
| 2005/0270296 A1 * | 12/2005 | Liu et al. | 345/501 |
| 2006/0203460 A1 * | 9/2006 | Aviv | 361/788 |

OTHER PUBLICATIONS

Sucamele, Randall. DSS Networks Press Release [Online]. Jan. 18, 2005 [Retrieved on Aug. 5, 2008] Retrieved from: http://www.dssnetworks.com/v3/news.asp?NewsItem=01-18-2005.*
Merriam-Webster Online [Online]. 1927 [Retrieved on Aug. 18, 2008] Retrieved from: http://www.merriam-webster.com/dictionary/infrastructure.*
English translation of China Office Action, dated Nov. 21, 2008, 6 pages.
English translation of China Office Action, dated Jun. 5, 2009, 7 pages.
English translation of China Office Action, dated Nov. 13, 2009, 4 pages.

* cited by examiner

*Primary Examiner* — J Bret Dennison
*Assistant Examiner* — Steven C Nguyen

(57) ABSTRACT

A distributed blade computer system and a method for operating a distributed blade computer system. More specifically, a computer system having one or more blades configured to operate as stand-alone computers are coupled to an infrastructure which includes one or more video modules. When a remote user wishes to implement video functions with a blade, a management subsystem in the infrastructure allocates a video module and couples the video module to the requested blade such that the blade can implement the video functions of the video module.

26 Claims, 3 Drawing Sheets

SWITCH TO SELECTIVELY COUPLE ANY OF A PLURALITY OF VIDEO MODULES TO ANY OF A PLURALITY OF BLADES

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light and not as admissions of prior art.

Multiple host computer systems that may be coupled through an interconnect infrastructure are becoming increasingly useful in today's computer industry. Unlike more traditional computer systems that include one or more processors functioning under the control of a single operating system, a multiple host distributed computer system typically includes one or more computer processors, each running under the control of a separate operating system. Each of the individually operated computer systems may be coupled to other individually operated computers systems in the network through an infrastructure, such as an Ethernet switch.

One example of a multiple host computer system is a "distributed blade computer system." A blade server architecture typically includes an ultra dense collection of processor cards, known as "blades" connected to a common power supply. The blades are generally mounted as trays in a rack which includes the power supply and an interconnect structure configured to provide remote access to the blades. Unlike traditional multi-processor systems, in which a single operating system manages the multiple processors in a unified execution system, the blade server system is generally a collection of independent computer systems, providing benefits, such as low power usage and resource sharing, over traditional separately configured computer systems.

Generally, a blade includes a processor and memory. Further, conventional blades generally include enough components such that each blade comprises a complete computer system with a processor, memory, video chip, etc. included in each blade and connected to a common backplane for receiving power and Ethernet connection. As computer resources become denser, it is important to optimize each computer resource so that it utilizes its allocated space and power efficiently. Because each blade is typically configured to perform as a "stand alone" server containing, among other things, a video controller, keyboard/video/mouse (KVM) redirection logic, and a management processor, each blade may be coupled to a video monitor to provide a stand alone computer resource. However, in modern data centers, systems are typically deployed in a "lights-out" configuration such that they are not connected to video monitors. Nevertheless, each individual blade is disadvantageously burdened with the extra cost, power and space necessary to provide a video controller and the associated redirection subsystem on each blade.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
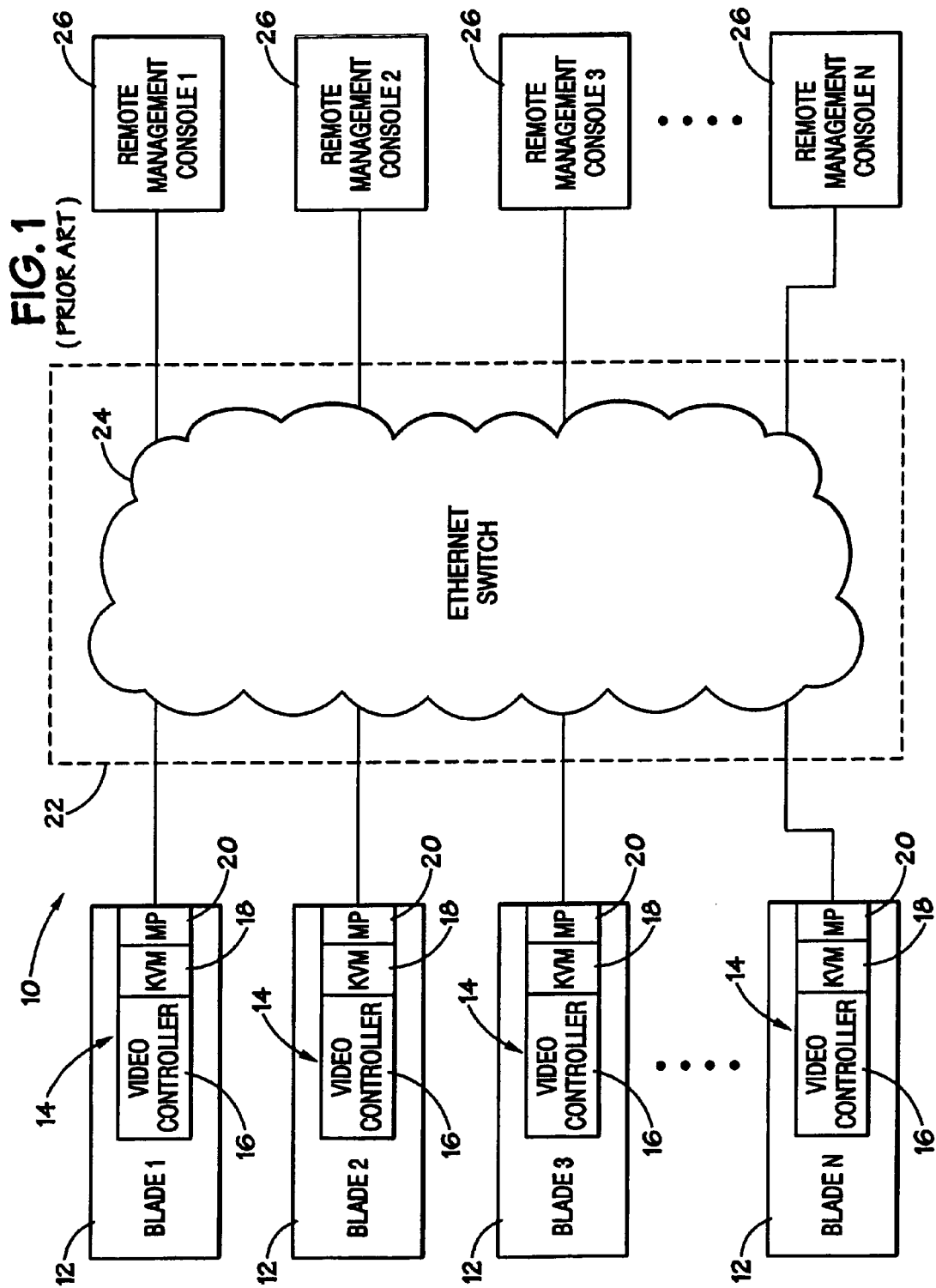
FIG. 1 is a block diagram of a conventional blade system.

Turning now to the drawings and referring initially to FIG. 1, a conventional blade system, generally designated by the reference numeral 10, is illustrated. The system 10 includes a number of blades 12. Each blade 12 generally comprises a stand alone computer system on a single card. Accordingly, each blade 12 includes one or more processors (not shown), memory chips (not shown) and one or more chip sets (not shown) configured to coordinate the networking functions of the blade 12. Further, each blade 12 includes a video graphics subsystem 14 configured to allow video control and processing at the blade 12. Each video graphics subsystem 14 may include a video controller 16, keyboard/video/mouse (KVM) redirection logic 18 and a management processor 20. Generally, the management processor 20 on each blade 12 is configured to coordinate the access to the blade 12. As will be appreciated by those skilled in the art, the video controller 16 and KVM redirection logic 18 provide a mechanism to create a virtual monitor remotely, to provide the stand alone capabilities for the blade 12 computer.

More specifically, applications running on the server blade 12 render information that is intended to be presented to a user by passing drawing commands through an operating system driver to the video controller 16. The video controller 16 renders these commands into a frame buffer (not shown) attached to the video controller 16. Additionally, the video controller 16 scans through the frame buffer, presenting the contents to an external display device (not shown) that may be connected to the system 10 to render the image to the end user. The KVM logic 18 captures the video output waveform intended for an external display device. The data is captured, compressed, encoded, and optionally encrypted. The resulting data stream is generally placed into packets consistent with the transmit medium (e.g., Ethernet packets for Ethernet switch, for instance) by the KVM redirection logic 18. These packets are finalized by the management processor 20 which initiates transmission of the information to the remote management console (discussed further below), which then decrypt, decode, decompress and render the image to the remote management console's display.

Each blade 12 is coupled to an infrastructure 22, such as a backplane in a rack mount system. The infrastructure 22 generally provides power and network connections to each of the blades 12 in the system 10. To provide network connections, the infrastructure 22 may include the Ethernet switch 24 for instance. Alternately, other networking and switching mechanisms, such as InfiniBand, or other distributed interconnect protocols may be implemented.

The system 10 also includes a number of remote management consoles (RMCs) 26, which are configured to access any of the blades 12 in this system 10 through the infrastructure 22. As described above, the management processor 20 on each blade 12 is configured to coordinate the access of the blade 12 by any RMC 26, while the video controller 16 and KVM redirection logic 18 provide a mechanism to create a virtual monitor remotely. In order to access the graphics functions on the blade 12, an RMC 26 accesses the video subsystem 14 on a particular blade 12. However, because none of the blades 12 include a system monitor, the only time the video and redirection logic (i.e. the video controller 16 and the KVM 18) are implemented for displaying images is when a RMC 26 is accessing the graphics capabilities. Otherwise, while the video controller 16 may be active, the KVM redirection logic 18 on the blade 12 remains idle. In other words, while each blade 12 is configured to include a video graphics subsystem 14, in many applications and instances, the video graphics subsystem 14 is not used for displaying a viewable image. As will be appreciated, unused system components negatively impact system performance, waste valuable real estate in the system and inject unnecessary costs. As described further below, the presently described exemplary embodiments address these shortcomings by off-loading the video graphics functions from the blade, thereby decoupling the display technology from the computer technology and allowing more optimal functionality of the system 10.

Figure 2:
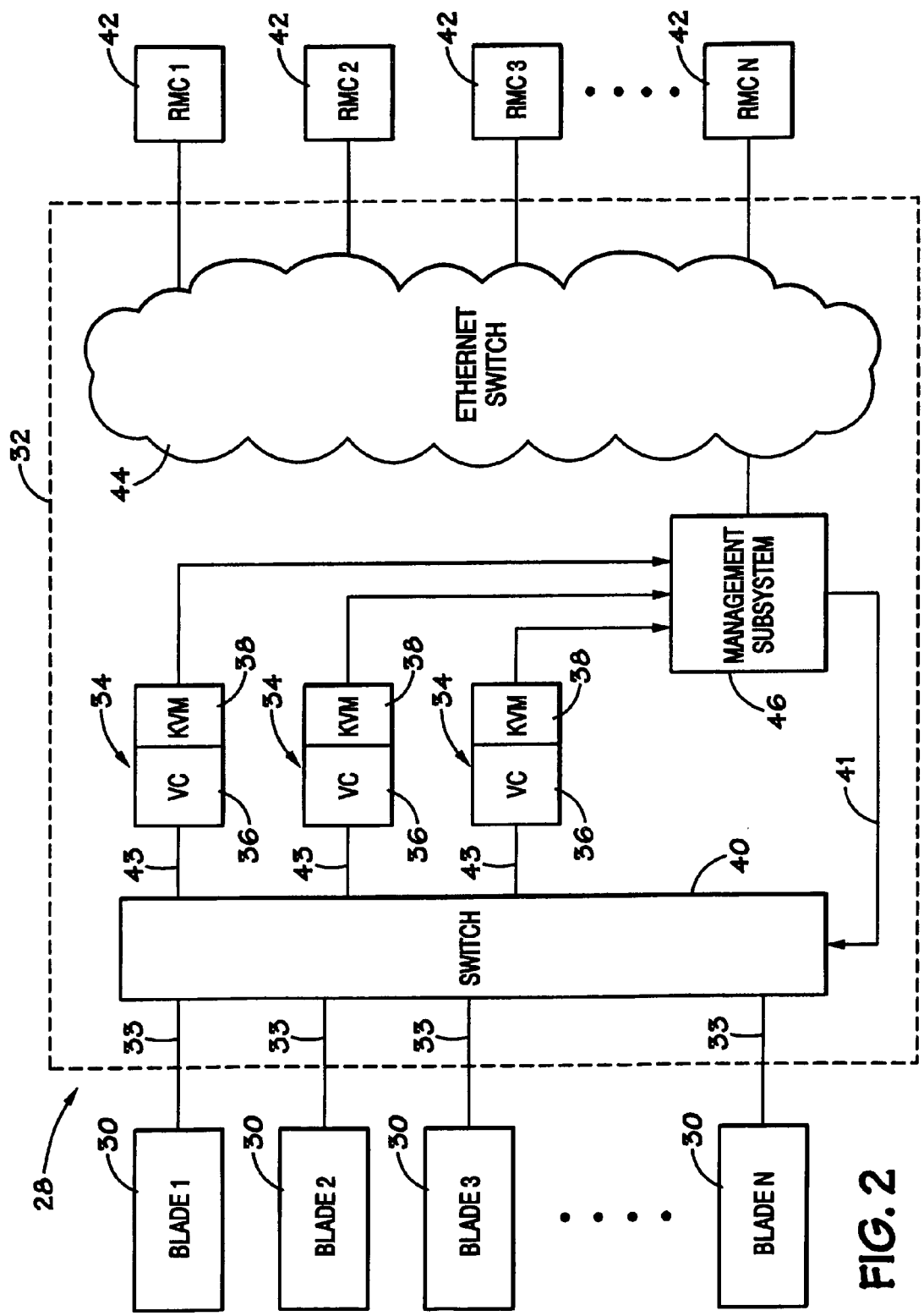
FIG. 2 is a block diagram of a blade system in accordance with embodiments of the present invention.

Turning now to FIG. 2, an optimized system 28 in accordance with embodiments of the present invention is illustrated. The system 28 includes a number of server blades 30. Unlike the blades 12 of the system 10 (FIG. 1), the blades 30 do not include video graphics hardware. Each blade 30 is coupled to the infrastructure 32 through an interconnect bus 33 such as a peripheral component interconnect (PCI) bus, a peripheral component interconnect express (PCI-E) bus, or any comparable bus interconnect protocol. The infrastructure 32 includes one or more video modules 34. Each of the video modules 34 includes a video controller 36 and KVM redirection logic 38. The number of video modules 34 may be chosen based on the number of simultaneous users predictably expected to perform administrative maintenance on the blades 30 within the system 28, since these functions generally implement the video graphics capabilities. Thus, if certain agents implementing the blades 30 will never require the use of video capability through a blade, there is no need to include a corresponding video module 34 for that particular agent.

Each blade 30 is coupled to each of the video modules 34 through a centralized switch 40. Alternately, only certain of the blades 30 may be configured to implement video resources and thus, only those blades 30 may be electrically connected to the video modules 34 through the switch 40. The switch 40 may be a modified version of a commonly known switch, such as a PCI express switch. The switch 40 is coupled to each of the blades 30 through respective interconnect buses 33 and to each of the video modules 34 through a respective video bus 43. Transactions transmitted through the switch 40 generally include information indicating the destination interconnect number and device, which allows the switch 40 to determine the transaction routing. If the interconnect bus 33 is a PCI-E bus, the switch 40 may comprise a PCI-E switch. Typically, PCI-E switches are used to bridge one or more PCI-E peripherals to a computer system. In accordance with embodiments of the present techniques, the switch 40 is employed to bridge one or more peripherals to one or more computer systems (blades 30). For a system implementing a switch 40 capable of routing between one or more peripherals and one or more blades 30, each cycle includes a source and destination address, command and data and additionally includes a host identifier to allow the peripheral to return data to the proper host (blade 30). In accordance with the present exemplary embodiment, a management subsystem 46 configures the switch 40 via a management bus 41. In one embodiment, the management bus 41 may be a simple "out-of-band" management bus such as I²C or JTAG. Alternatively, the management bus 41 may operate "in-band" through another PCI-E link. The management subsystem 46 preferably reconfigures routing tables and configuration information inside the switch 40 to allow the video module 34 to be added to the appropriate host system 30. The management subsystem 46 may also instruct the switch 40 to initiate a "hot-plug" event to the host system (blade 30), consistent with the PCI-E specification. To the host blade 30, it appears as if a PCI-E video adapter card is plugged into a hot-pluggable slot on the blade 30.

In accordance with another exemplary embodiment, the switch 40 may comprise a simple crossbar switch, such as a field effect transistor (FET) based crossbar. In accordance with this embodiment, the switch 40 may include a plurality of FET-type switches configured to provide connection from any host interconnect bus 33 and any video bus 43. The management subsystem 46 configures the switch 40 using a management bus 41. In this embodiment, the management bus 41 may be a simple "out-of-band" management bus such as I²C or JTAG, or may consist of a plurality of "enable" signals corresponding to each possible permutation. The management subsystem 46 asserts the correct "enable" signal (either directly or indirectly through a register in the switch 40), allowing the FET to enable a physical electrical connection between the selected blade 30 and the selected video component 34. As in the previous embodiment, this appears to the host blade 30 as if a PCI-E video adapter card is plugged into a hot-pluggable slot on the blade 30.

In accordance with embodiments of the present invention, the system 28 is configured such that any one of the blades 30 may be coupled to any one of the video modules 34. Accordingly, if a user requests video functionality along with a blade 30, the system 28 is configured such that a video module 34 is selected and coupled to the requested blade 30 through the switch 40, as described further below. Further, each blade 30 is preferably hot-pluggable, such that the blade 30 may be coupled to the system 28 while the system is powered on and such that any number of blades 30 may be added or removed from the system 28. Likewise, the system 28 may be configured such that additional video modules 34 may also be added or hot-plugged into the system 28.

As previously described, the system 28 includes a number of remote management consoles (RMCs) 42 which are coupled to the system 28 through a switch, such as an Ethernet switch 44. Alternatively, other types of interconnects may be employed instead of the Ethernet switch 40. For example, distributed interconnects such as Infiband, Fibrechannel or Ethernet may be employed. As will be appreciated, these distributed interconnects typically do not use bridges for connecting multiple interconnects or networks, but rather use devices such as routers, which route transactions across a network of connected interconnects. Typically, such distributed interconnects do not act as a single interconnect hierarchy, but instead act as multiple connected systems. Further, the infrastructure 32 includes a management subsystem 46 configured to process requests and administer control between the blades 30, the video modules 34 and the RMCs 42. If a user at a RMC 42 wishes to administer a particular blade 30, the user accesses the blade 30 through the management subsystem 46, as described further below.

Figure 3:
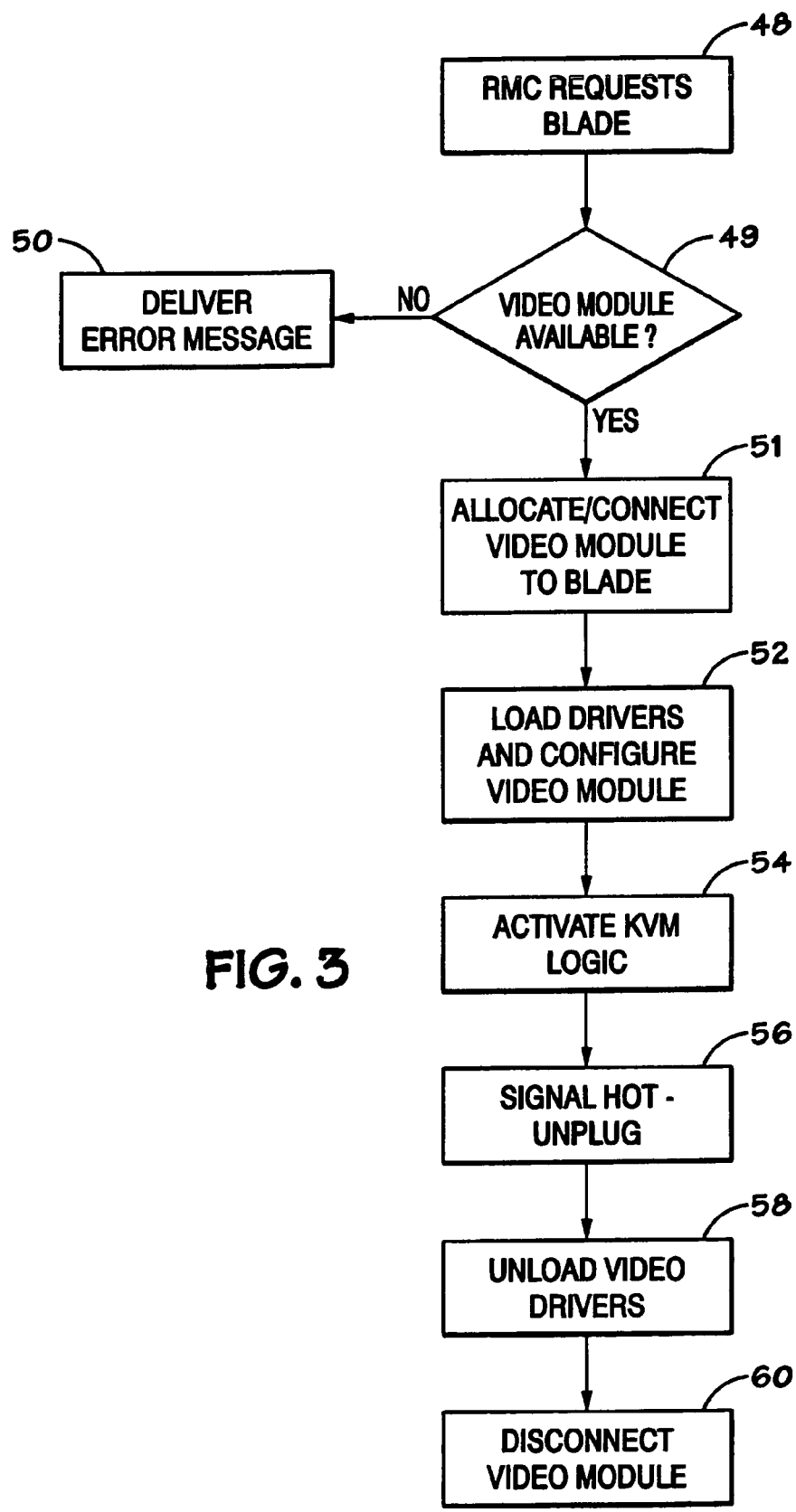
FIG. 3 is a flow chart illustrating an exemplary implementation of the blade system illustrated in FIG. 2.

FIG. 3 is a flow chart illustrating an exemplary technique for implementing the video modules 34 of the blade system 28 illustrated in FIG. 2. The flow chart illustrates an exemplary session wherein a blade 30 and video subsystem 34 are accessed by an RMC 42, and then returned to their initial states for use by other RMCs 42. First, a user (through a RMC 42) requests a particular blade 30, as indicated in block 48. The RMC 42 establishes a connection with the management subsystem 46, preferably via the Ethernet switch 44. The user on the RMC 42 may use a web browser to establish a connection to management system 46, for instance. In one exemplary embodiment, the management system 46 constructs a hyper text markup language (HTML) page containing links to each of the blades 30 managed by the infrastructure 32. As will be appreciated, the list may not be HTML or in web page form. For example, software running in the RMC 42 may request the information as to which servers are available through a machine-to-machine interface, such as extensible markup language (XML).

If the user on the RMC 42 requests a remote console session to any of the blades 30 (either through HTML links presented by the web page presented by the management subsystem 46, through XML commands, or other control mechanism), the management subsystem 46, which is responsible for managing the pool of video resources 34, checks to see if a video module or resource 34 is available, as indicated in block 49. If not, the management subsystem 46 composes a error response to deliver to the RMC 42, as indicated in block 50. The error message may be in the form of a web page indicating that the required resource is not available. The message could further suggest that the user try again later or that the user will be notified when resource becomes available, for example.

If the video resource is available, the management subsystem 46 allocates a video module 34 and programs the crossbar switch 40 to connect the video module 34 to the blade 30 that the user wishes to manage, as indicated in block 51. The blade 30 is configured to recognize the new video subsystem through hot-pluggable means and within the interface bus specification. As a result, the plug-and-play operating system executing on the blade 30 recognizes a "hot-plug" event, loads the appropriate video driver and configures the video module 34 to begin displaying consoled video from that operating system, as indicated in block 52. "Plug and play" is a term used in the computer field to describe a computer's ability to have new devices, normally peripherals, added to it without having to reconfigure or restart the computer. There are a number of terms or variations that describe similar abilities, including PnP, and hot swapping. The term Plug and Play is often associated with Microsoft, who started using it in reference to their Windows 95 product. As will be appreciated, the present techniques may be employed in any of these types of systems.

Once configured, the management subsystem 46 activates the KVM redirection logic 38 in the assigned video module 34 thereby allowing the RMC 42 to interact with the managed blade 30, as indicated in block 54. The management subsystem 46 then may supply the RMC 42 with a JAVA applet or ActiveX control to process the KVM data. As data is procured by the KVM module 38, it is forwarded to the applet or AciveX control running on RMC 42 for display. The management subsystem 46 is capable of processing a plurality of data streams and may forward this information directly to the RMC 42. The management subsystem 46 may also place data retrieved from KVM 38 and store it temporarily in a memory provided in the management subsystem 46 (not shown). When a packet is ready for transmit (either packet full or packet timeout), the management subsystem 46 may finalize the packet and apply appropriate headers to insure it reaches the intended RMC 42.

When the administrative session is no longer desired, the management subsystem 46 signals a "hot-unplug" event to the appropriate server (blade 30), as indicated in block 56. The operating system responds by quiescing the outstanding video draw activity (O/S driver) and unloading the video driver, as indicated in block 58. Typically, a disconnection request is sent to the host blade 30 to allow software to quiesce the device to notify the operating system running on the host blade 30 that it will be powered-down. In accordance with one embodiment, the management subsystem 46 may assert the appropriate signal to generate such a request to the blade 30. In this embodiment, the management processor 46 samples a signal consistent with the bus interface specification to know when the OS has quiesced the device. Typically, the hot-plug controller contains a signal (different from the hot-remove request) that is asserted when it is safe to remove the device. Typically, this signal is wired to an LED for purposes of visual indication to a user that a card can be removed. However, this signal can be monitored by the management processor 46 to provide an automatic means of disconnection. The management subsystem 46 may then disconnect the device from the blade, returning it to the "pool" for use by other RMCs 42, as indicated in block 60.

The base functions described above may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain or store the instructions. The computer readable medium can be an electronic, a magnetic, or an optical system, apparatus, or device. An illustrative, but non-exhaustive list of computer-readable mediums can include a portable computer diskette (magnetic), a random access memory (RAM) (magnetic), a read-only memory (ROM) (magnetic), an erasable programmable read-only memory (EPROM or Flash memory) (magnetic), and a portable compact disc read-only memory (CDROM) (optical).

Advantageously, the system 28 eliminates unnecessary video hardware from computing resources (i.e., the blades 30) and allows the video hardware to be dynamically scaled based on the usage model of a particular customer. For instance, if many blades 30 need to be managed simultaneously, many video resources (i.e. video modules 34) can be added to the infrastructure 32. If fewer blades 30 need to be managed simultaneously, the customer can populate fewer video modules 34 within the infrastructure 32. Further, the amount of video resources can be adjusted with the changing needs of the customer. Further, each blade 30 benefits by having fewer components and consuming less power.

Still further, since the KVM redirection logic 38 is shared by multiple blades 30, it can be more complex, allowing it to redirect the full capabilities of the video controller 36. Additionally, the video modules 34 can be upgraded independently of the blades 30 as the video graphics requirements change. For example, emerging security standards may require that video modules 34 to be upgraded to support "secure video." For example, it may be advantageous for future operating systems to include the ability to establish secure connections between a host and a video module such that the other bus agents or software components cannot snoop or view sensitive data that may be displayed. Advantageously, such upgrades could be offered to consumers without requiring replacement of existing blades 30.

While embodiments of the present invention are describe a system and technique for simplifying the configuration of the blades 30 and pooling video module 34 resources, it should be understood that in accordance with alternate embodiments, other resources may be pooled for selection and use by any of the RMCs 42. For instance, one or more peripheral devices, such as a floppy drive, tape drive or compact disk drive may also be provisioned in a pool and allocated to a particular blade 30 as needed by an RMC 42.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:
   a plurality of blades, wherein none of the plurality of blades include a video controller and none of the plurality of blades include keyboard video mouse (KVM) redirection logic;
   a plurality of video modules;
   a first switch configured to selectively couple any one of the plurality of video modules to any one of the plurality of blades, wherein the first switch selectively coupling a particular one of the plurality of video modules to a particular one of the plurality of blades causes the particular blade to detect addition of the particular video module as a hot plug event, and wherein the particular blade has an operating system that is responsive to the hot plug event to load a video driver to operate with the particular video module; and
   a management subsystem coupled to the first switch and the plurality of video modules and configured to control the first switch to selectively couple any one of the plurality of video modules to any one of the plurality of blades in response to a request.

2. The system, as set forth in claim 1, further comprising at least one remote management console and an infrastructure that comprises the plurality of video modules and the first switch, wherein the at least one remote management console is coupled to the infrastructure and configured to access the plurality of blades through the infrastructure, wherein the remote management console is configured to interact with the particular video module so that video data from the particular video module is displayed at the remote management console.

3. The system, as set forth in claim 2, wherein the infrastructure further comprises a second switch and the management subsystem, and wherein the second switch is coupled between the at least one remote management console and the management subsystem.

4. The system, as set forth in claim 3, wherein the second switch comprises an Ethernet switch.

5. The system, as set forth in claim 1, wherein each of the video modules comprises a video controller.

6. The system, as set forth in claim 5, wherein each of the video modules comprises keyboard video mouse (KVM) redirection logic.

7. The system, as set forth in claim 1, wherein the first switch comprises a peripheral component interconnect express (PCI-E) switch.

8. A system comprising:
   a plurality of blades, wherein none of the plurality of blades include a video controller and none of the plurality of blades include keyboard video mouse (KVM) redirection logic;
   a first switch to selectively couple any one of a plurality of hot-pluggable video modules to any one of the plurality of blades, wherein a particular one of the plurality of blades detects addition of a particular one of the plurality of video modules as a hot plug event when the first switch couples the particular video module to the particular blade; and
   a management subsystem configured to control the first switch to selectively couple any one of the plurality of video modules to any one of the plurality of blades.

9. The system, as set forth in claim 8, further comprising:
   one or more remote management consoles; and
   an infrastructure coupled between the one or more remote management consoles and the plurality of blades.

10. The system, as set forth in claim 9, wherein the infrastructure comprises:
    the plurality of video modules;
    the first switch;
    the management subsystem; and
    a second switch coupled between the management subsystem and each of the one or more remote management consoles.

11. A method of operating a distributed blade computer system comprising:
    receiving, at a management subsystem, a request from a remote console to connect to a particular one of a plurality of blades in the computer system, wherein the particular blade is without a video controller and is without keyboard video mouse (KVM) redirection loqic;
    allocating, by the management subsystem, a video module from a pool of plural video modules to the particular blade, wherein each of the plural video modules includes a corresponding video controller; and
    causing, by the management subsystem, coupling of the allocated video module to the particular blade, wherein the particular blade detects addition of the allocated video module as a hot plug event, and wherein coupling of the allocated video module to the particular blade allows the video controller of the allocated video module to render information provided by the particular blade into video data for communication to the remote console to display at the remote console.

12. The method, as set forth in claim 11, further comprising:
    loading one or more video drivers onto the particular blade in response to the hot plug event, wherein the loading is performed by an operating system in the particular blade; and
    activating keyboard video mouse (KVM) redirection logic in the allocated video module.

13. The method, as set forth in claim 12, further comprising:
    signaling an unplug event to the particular blade;
    unloading the one or more video drivers from the particular blade; and
    disconnecting the allocated video module from the particular blade.

14. A non-transitory computer-readable storage medium storing computer instructions that when executed cause a computer-based system to:
- receive, from a remote console, a request to connect to a particular one of a plurality of blades in a blade server system, wherein the particular blade is without a video controller and is without keyboard video mouse (KVM) redirection logic;
- allocate, from a pool of video modules, a video module to the one of the plurality of blades, wherein each of the video modules includes a corresponding video controller; and
- cause coupling of the allocated video module to the particular blade, wherein the coupling causes an operating system in the particular blade to detect addition of the allocated video module as a hot plug event and to respond to the hot plug event by loading a video driver in the particular blade to interact with the allocated video module.

15. The non-transitory computer-readable storage medium, as set forth in claim 14, further storing computer instructions that when executed cause the computer-based system to further:
- configure the allocated video module; and
- activate keyboard video mouse (KVM) redirection logic in the allocated video module.

16. The non-transitory computer-readable storage medium, as set forth in claim 15, further storing computer instructions that when executed cause the computer-based system to further:
- signal an unplug event to the particular blade, wherein the unplug event causes the video driver to be unloaded from the particular blade; and
- cause disconnection of the allocated video module from the particular blade after detecting an indication of quiescing of the video driver.

17. The system, as set forth in claim 1, wherein the management subsystem is to further:
- determine whether any video module of the plurality of video modules is available;
- select one of the available video modules to use in response to a request from a remote console to connect to the particular blade; and
- control the first switch to connect the selected video module to the particular blade, wherein a video resource of the selected video module is used for displaying data at the remote console, wherein the data displayed at the remote console is based on information produced in the particular blade, and wherein the particular blade is without a video controller.

18. The system, as set forth in claim 1, wherein a number of the plurality of video modules is less than a number of the plurality of blades.

19. The system, as set forth in claim 8, wherein the management subsystem is to further:
- determine whether any video module of the plurality of video modules is available;
- select one of the available video modules to use in response to a request from a remote console to connect to the particular blade; and
- control the first switch to connect the selected video module to the particular blade, wherein a video resource of the selected video module is used for displaying data at the remote console, wherein the data displayed at the remote console is based on information produced in the particular blade, and wherein the particular blade is without a video controller.

20. The method, as set forth in claim 11, wherein coupling the allocated video module to the one of the plurality of blades comprises the management subsystem controlling a switch to couple the allocated video module to the one of the plurality of blades, wherein the switch is configured to couple any of the plural video modules to any of the plurality of blades.

21. The method, as set forth in claim 11, wherein allocating the video module comprises determining whether any video module in the pool is available, and wherein the allocated video module is an available one of the video modules in the pool.

22. The system, as set forth in claim 1, wherein the operating system of the particular blade is responsive to the hot plug event to further configure the particular video module to cause the particular video module to display video data from the operating system.

23. The system of claim 8, further comprising the plurality of video modules, wherein each of the plurality of video modules comprises a video controller and keyboard video mouse (KVM) redirection logic.

24. The system of claim 8, wherein the particular blade includes an operating system that is responsive to the hot plug event to load a video driver to cooperate with the particular video module, and wherein the particular video module is configured to render information provided in the particular blade into video data for communication to a remote management console for display at the remote management console.

25. The method of claim 11, wherein coupling of the allocated video module to the particular blade causes an operating system of the particular blade to respond to the hot plug event by loading a video driver in the particular blade to interact with the allocated video module.

26. The non-transitory computer-readable storage medium of claim 14, wherein coupling of the allocated video module to the particular blade allows the video controller in the allocated video module to render information produced by the particular blade into video data for communication to the remote console to display at the remote console.

* * * * *

UNITED STATES PATENT AND TRADEMARK OFFICE
CERTIFICATE OF CORRECTION

| | | |
|---|---|---|
| PATENT NO. | : 7,966,402 B2 | Page 1 of 1 |
| APPLICATION NO. | : 11/168129 | |
| DATED | : June 21, 2011 | |
| INVENTOR(S) | : Theodore F. Emerson et al. | |

It is certified that error appears in the above-identified patent and that said Letters Patent is hereby corrected as shown below:

In column 8, line 39, in Claim 11, delete "loqic" and insert -- logic --, therefor.

Signed and Sealed this
Seventeenth Day of January, 2012

David J. Kappos
*Director of the United States Patent and Trademark Office*